United States Patent
Gerrish et al.

(10) Patent No.: US 6,606,191 B1
(45) Date of Patent: Aug. 12, 2003

(54) METHOD FOR CONTROLLING PERFORMANCE OF OPTICAL AMPLIFIERS

(75) Inventors: Kevin S. Gerrish, Elmira, NY (US); Muhidin Lelic, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/145,456

(22) Filed: May 13, 2002

(51) Int. Cl.$^7$ ............................................... H04B 10/12
(52) U.S. Cl. .................................................. 359/341.4
(58) Field of Search ............................. 359/341.4, 337, 359/341.41, 341.42, 124, 161

(56) References Cited

U.S. PATENT DOCUMENTS

| | | | |
|---|---|---|---|
| 6,023,366 A | 2/2000 | Kinoshita | 359/341 |
| 6,111,688 A | 8/2000 | Kobayashi et al. | 359/341 |
| 6,118,576 A | 9/2000 | Sugiya et al. | 359/341 |
| 6,172,534 B1 | 1/2001 | Brierley | 327/58 |
| 6,198,571 B1 | 3/2001 | Yang | 359/337 |
| 6,201,636 B1 | 3/2001 | Noda | 359/337 |
| 6,229,643 B1 | 5/2001 | Nakamura | 359/341 |
| 6,233,091 B1 | 5/2001 | Kosaka et al. | 359/341 |
| 6,246,514 B1 | 6/2001 | Bonnedal et al. | 359/341 |
| 6,256,141 B1 | 7/2001 | Kosaka | 359/341 |
| 6,266,466 B1 | 7/2001 | Nabeyama et al. | 385/48 |
| 6,275,330 B1 | 8/2001 | Izumi | 359/341.42 |
| 6,282,017 B1 | 8/2001 | Kinoshita | 359/341.42 |
| 6,288,836 B1 | 9/2001 | Kawasaki et al. | 359/341.42 |
| 6,525,873 B2 * | 2/2003 | Gerrish et al. | 359/341.4 |

* cited by examiner

Primary Examiner—Mark Hellner
(74) Attorney, Agent, or Firm—Svetiana Z. Short

(57) ABSTRACT

A method for compensating for ASE in gain control mode while controlling gain of an optical amplifier, the method including the following steps: (i) obtaining value for input and output power electronic circuitry DC offset; (ii) selecting the following set point values: power set point=0.0, gain set point=desired gain, (iii) obtaining digital value representing signal input value and subtracting input power electronic circuitry DC offset to produce adjusted input power value; (iv) obtaining digital value representing signal output value and subtracting output power electronic circuitry DC offset to produce adjusted output power value; (v) obtaining the ASE content of the adjusted input power value by either utilizing a lookup table or a formula and subtract ASE content from the adjusted input power value to produce ASE adjusted output power value; (vi) either multiplying the gain setpoint by the obtained ASE adjusted input power value and subtracting this from the ASE adjusted output power value, or dividing the ASE adjusted input power to obtain gain control error signal; (vii) subtracting the gain control error signal from any number to produce a controller input signal; (viii) transforming the controller input signal into digital representation of at least one pump control signal by a control algorithm; (xi) transforming said digital representation of said at least one pump control signal into at least one corresponding analog pump control signal; and (x) applying the at least one analog pump control signal to at least one pump via driver circuitry.

11 Claims, 10 Drawing Sheets

METHOD FOR CONTROLLING PERFORMANCE OF OPTICAL AMPLIFIERS

CROSS-REFERENCE TO A RELATED APPLICATION

This application claims the benefit of U.S. patent application Ser. No. 09/821,926, filed Mar. 30, 2001, now U.S. Pat. No. 6,525,873 which claims the priority of provisional application serial No. 60/196,596, filed Apr. 13, 2000 in the name of Gerrish et al., entitled "METHOD FOR CONTROLLING PERFORMANCE OF OPTICAL AMPLIFIERS", the benefit of priority is hereby claimed. Reference is also made to patent application filed concurrently in the name of Gerrish et al., entitled "Optical Amplifiers with a Simple Gain/Output Control Device". Both applications are incorporated by reference, herein.

FIELD OF THE INVENTION

This invention relates to optical amplifiers and more specifically to a method for automatic gain, pump power or current and output power control, and ASE compensation of Optical Amplifiers.

BACKGROUND

In recent years optical amplifier modules have undergone considerable transformation. Increased demand for more data transfer resulted in development of wavelength division multiplexing (WDM) technology, which allows more data to be transmitted over one fiber by increased channel count (i.e., a larger number of narrower wavelength ranges within the same predetermined wavelength window). This WDM technology suffers from unwanted effects, such as a variation in output power when the input signal power is constant (for example, due to aging of the amplifier or due to stresses in the amplifier), and cross talk between different channels, for example, when the input signal is modulated at a low frequency. The low frequency is a frequency of up to 10 kHz. This low frequency modulation can be present, for example, due to the addition or dropping of some to the channels, or due to sudden loss of signal at certain wavelengths. These unwanted effects have a negative influence on the power transients (i.e., fluctuations of output optical signal power) of surviving channels, which results in a poor performance of the signal transmission, expressed in an increased bit error rate (BER).

In order to minimize the unwanted output signal power fluctuation and the power transients due to the cross talk or other causes (such as fiber damage, adding or dropping of channels), it is common to introduce a mechanism for controlling either the output signal power or the gain of the optical fiber amplifier. Gain is the ratio of the optical signal output power to the optical signal input power.

There are two known approaches for controlling output signal power or the gain of the optical fiber amplifier. The first approach, known as the electronic feedback/feedforward approach, utilizes electronic circuitry to control power transients caused by the crosstalk produced in the optical fiber amplifier. More specifically, amplifier gain or power is controlled by analog tuning of the electronic components, for example by changes resistor's or capacitor's values. This approach allows the user, such as a communication company, to minimize power transients in any given optical amplifier by controlling either the amplifier gain or the amplifier output power, but not both. This approach also limits accuracy of gain control when signal power is small. Finally, this approach does not compensate for amplifier noise, such as ASE (amplified spontaneous emission).

The second approach, known as the optical feedback control approach, utilizes only optical components to control power transients of the optical fiber amplifier. This approach is even less flexible than the all-electronic approach described above, because any change in power or gain control requirements requires the change in optical components.

SUMMARY OF THE INVENTION

The present invention is set forth in the appended claims. According to one embodiment of the present invention a method for compensating for ASE in gain control mode while controlling gain of an optical amplifier, the method including the following steps: (i) obtaining value for input and output power electronic circuitry DC offset; (ii) selecting the following set point values: power set point=0.0, gain set point=desired gain, (iii) obtaining digital value representing signal input value and subtracting input power electronic circuitry DC offset to produce adjusted input power value; (iv) obtaining digital value representing signal output value and subtracting output power electronic circuitry DC offset to produce adjusted output power value; (v) obtaining the ASE content of the adjusted input power value by either utilizing a lookup table or a formula and subtract ASE content from the adjusted input power value to produce ASE adjusted output power value; (vi) either multiplying the gain setpoint by the obtained ASE adjusted input power value and subtracting this from the ASE adjusted output power value, or dividing the ASE adjusted input power to obtain gain control error signal; (vii) subtracting the gain control error signal from any number to produce a controller input signal; (viii) transforming the controller input signal into digital representation of at least one pump control signal by a control algorithm; (xi) transforming said digital representation of said at least one pump control signal into at least one corresponding analog pump control signal; and (x) applying the at least one analog pump control signal to at least one pump via driver circuitry.

For a more complete understanding of the invention, its objects and advantages refer to the following specification and to the accompanying drawings. Additional features and advantages of the invention are set forth in the detailed description, which follows.

It should be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

PREFERRED EMBODIMENTS

Figure 1A:
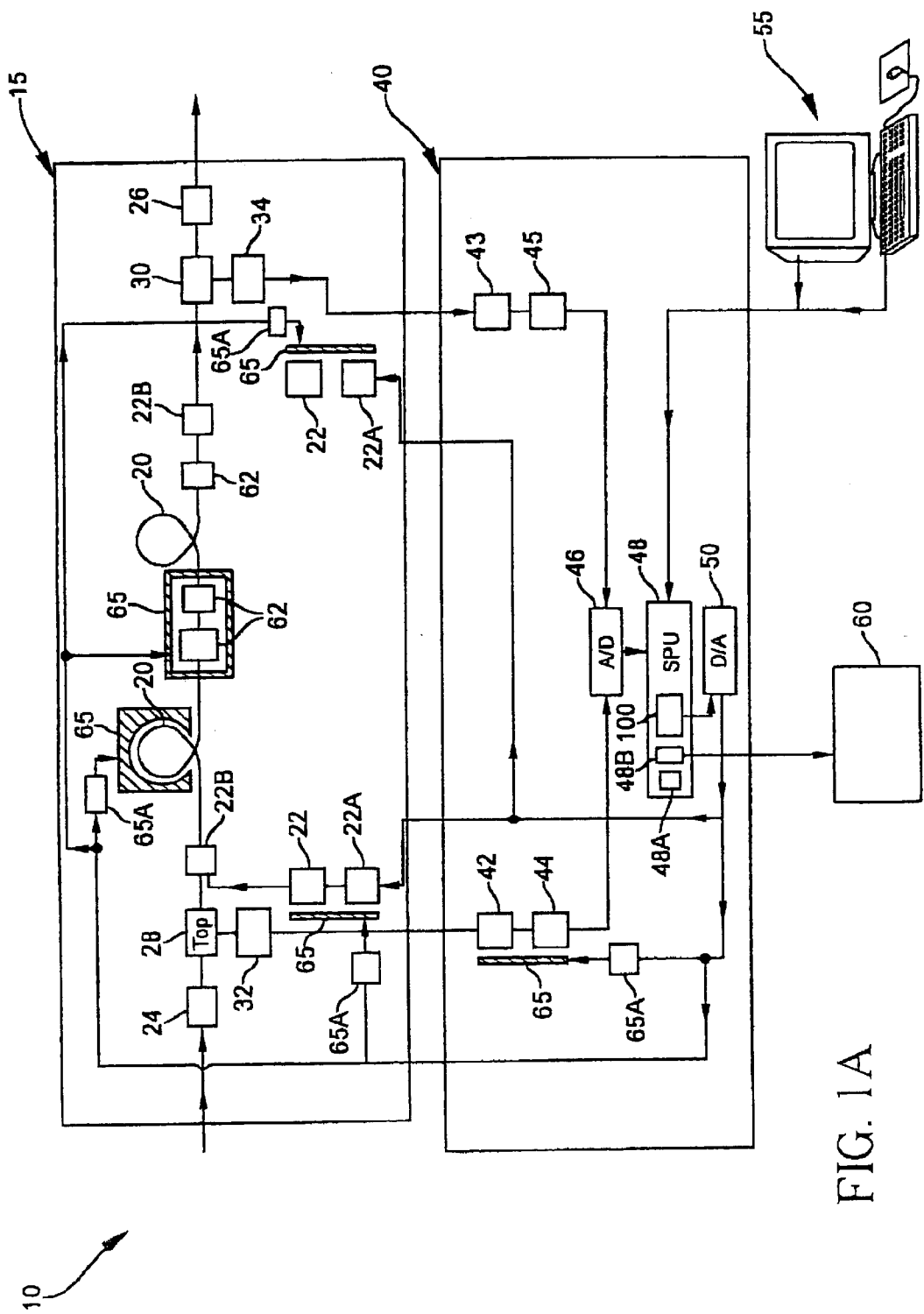
FIG. 1A illustrates schematically an optical fiber amplifier 10.
Figure 1B:
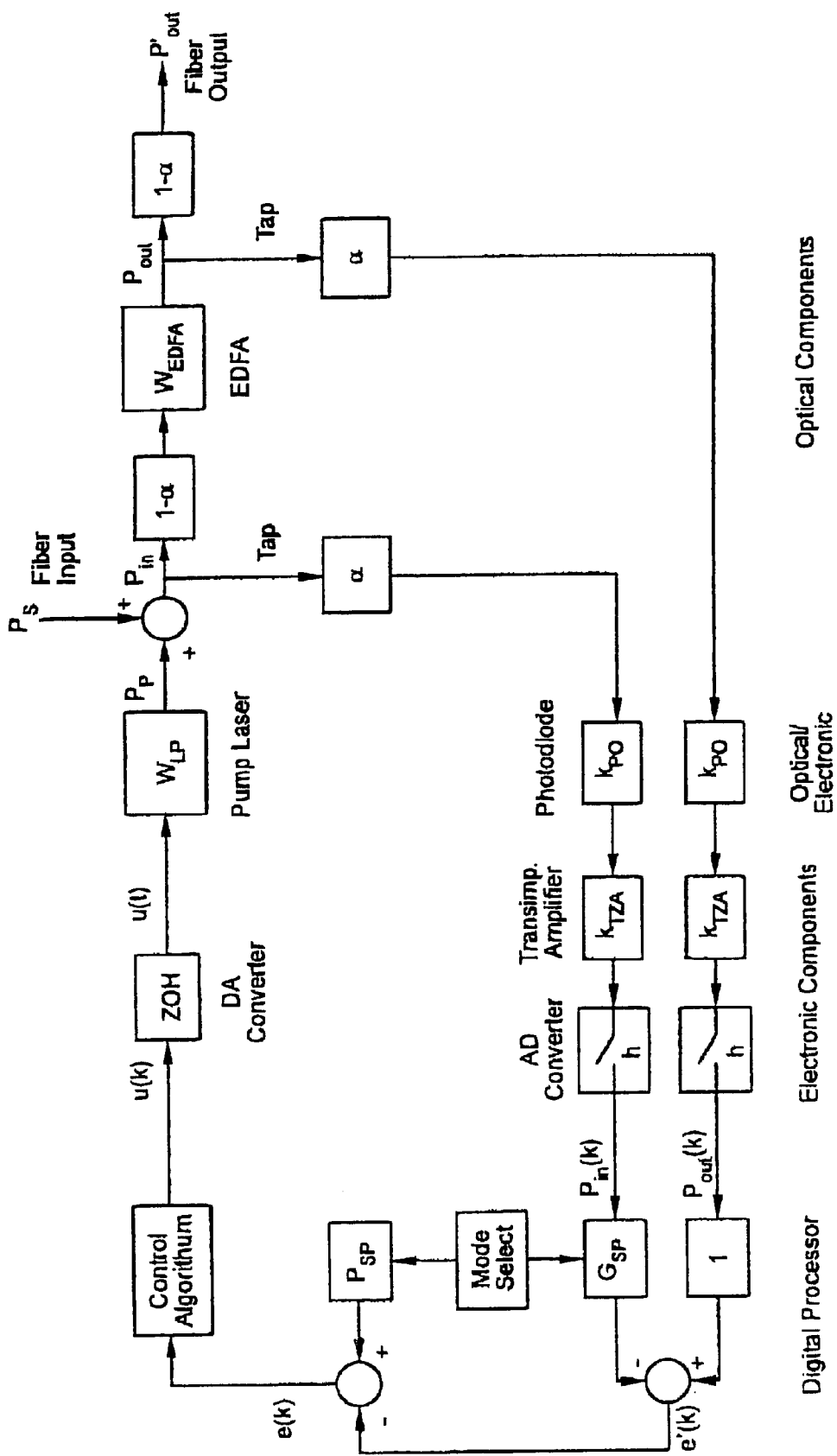
FIG. 1B is shows a more detailed block diagram of a controller of the amplifier of FIG. 1A.

FIGS. 1A and 1B illustrate an embodiment of an improved optical fiber amplifier 10. This optical fiber amplifier 10 includes an optical system 15 comprised of an optical gain medium 20, for example a rare-earth doped fiber and at least one pump source 22, such as a laser diode, driven by a pump drive unit 22A coupled via a coupler 22B to the optical gain medium 20. The optical system further includes an input port 24 for an optical signal entering the gain medium 20, an output port 26 for an out-going signal and two optical taps 28 and 30. The tap 28 is an input optical signal tap 28 and is connected to a first optical detector 32. The tap 28 is located either downstream of the input port 24, but in front of the gain medium 20, or, alternatively, may form a part of an input port 24 or the coupler 22B. The tap 30 is an output optical signal tap and is connected to a second optical detector 34. The tap 30 is located downstream of the gain medium 20 in front of the output port 26. Alternatively the tap 30 may form a part of the output port 26. In this embodiment the optical detectors 32 and 34 are photodiodes. With reference to FIG. 1B, in this embodiment, both input and output signal taps 28, 30 of the amplifier 10 have the same ratio $\alpha(\alpha=0.02)$. This ratio $\alpha$ is defined as the optical signal power channeled into a tap divided by the total optical signal just before the tap. However, the input and output taps may be characterized by different a values. For example, if the total signal approaching the input tap is weak, a larger a ratio may be required by the input tap 28 in order to provide a better detection by the optical detector 32. Thus, predetermined portions of the total input optical signal power $P_{in}$ and of the total output power $P_{out}$ are channeled into the taps 28, 30 according to their $\alpha$ ratios. The amplifier 10 may also include other optical components. These components are, for example, isolators, attenuators, light splitting couplers, optical multiplexers, demultiplexers and filters.

The amplifier 10 further includes an electronic controller 40. It is the electronic controller 40 that controls the pump source 22 (for example by controlling drive current of the laser diode) by receiving information about optical power levels of the input and output signals. In this embodiment the electronic controller 40 includes input and output signal converters 42 and 43, which convert signals from the optical detectors 32 and 34, respectively, to electrical signals, and electrical signal amplifiers, such as transimpedance amplifiers 44, 45 that amplify the electrical signals provided by the optical detectors 32, 34. The electronic controller 40 further includes at least one analog to digital (A-to-D) converter 46 that converts amplified electrical signals to digital signals. The electronic controller 40 also includes at least one signal processing unit 48, such as a digital signal processing unit for processing the digital signals into a new set of digital signals and a digital to electrical signal converter 50, for converting the new set of digital signals to a new set of electrical signals. The level of pump power produced by the pump source 22 is determined by this new set of electrical signals. According to one embodiment of the present invention the signal processing unit 48 of the amplifier 10 is coupled to a user interface 55 that allows a user to chose and specify an amplifier control mode. The user, by specifying an appropriate control mode, commands the signal processing unit 48 to control changes in DC offset calibration, specifies a desired amplifier gain value; amplifier output power value, or optical noise (ASE) compensation. DC offset calibration is a process of compensation for constant error or noise signals (dark current, for example) introduced by the electronic or optical devices. This embodiment of the invention utilizes a feed-back loop to provide an automatic gain and output power control of optical fiber amplifier 10. A feed forward loop may be utilized in addition to the feedback loop to improve the power transients, if needed. The disclosed control method utilizes a unique control algorithm 100, described below. The algorithm 100 of this embodiment is based on the Proportional Plus Integral (PI) control law and is implemented in the digital signal processing unit 48 of the controller 40. Other control laws may also be utilized. Based on the user selected control mode specified through the user interface 55 and the data about optical power levels provided by the taps 28 and 30, the algorithm 100 controls the output power of the pump source 22 and, therefore, the amplifier output optical power $P_{out}$. More specifically, the controller 40, through its signal processing unit 48 and the control algorithm 100, commands one or more pump drive units 22A to drive one or more pump laser sources 22 so as to increase or decrease optical power provided by the pump laser source 22. As stated above, this optical power is used for exciting the energy level of rare-earth ions (Erbium, for example) in the rare-earth doped amplifying fiber corresponding to the gain medium 20. Thus, the pump laser source 22 controls the amplifier by injecting the appropriate level of optical power at a specified wavelength to the optical gain medium fiber 20. The amplifier control model may include the control of amplifier gain, output power, temperature, laser diode overcurrent and ASE (amplifier spontaneous emission). The end user is provided with a menu of control modes to choose from. The following is a more detailed description of the amplifier 10 and the algorithm 100.

As discussed above, the optical signals channeled by the taps 28, 30 are detected by the detectors 32, 34 that provide electrical signals, such as current. The amplitude of the electrical signals provided by these detectors 32, 34 corresponds to the amplitude of the optical power incident on these detectors. Therefore, these electrical signals correspond to the total input optical signal power $P_{in}$ and total output power $P_{out}$ of the optical amplifier 10. The A-to-D converter 46 converts analog (i.e., electrical) signals, to a digital (i.e., numerical) representations of this signals, to be used by a typical computer or a processor. It is preferable that the A-to-D converter 46 has at least 12 bits of resolution in order to achieve a good dynamic range (i.e., greater than 30 dB (1000:1)). The digital signal processing unit 48 of this embodiment takes discrete samples of digital data provided to it by the A-to-D converter 46 at a high frequency rate (i.e., at 1 MHz or higher sampling frequency) and the algorithm 100 of the digital signal processing unit 48 processes this data. The high sampling speed is needed to preserve the frequency characteristics of the analog power signal. If the sampling rate were low, part of the information about the signal would be lost.

In order to process the control algorithm 100 at the high frequency rate, it is preferable that the digital signal processing unit 48 has enough speed and computational power to complete all control calculations and additional signal processing such as alarm processing and monitoring of problematic conditions such as, for example, low signal power, low output signal, loss of input signal, high temperature, low temperature, or laser diode over-current.

More specifically, the input signal power, the output signal power (and optionally, temperature of the amplifier or its components, laser diode current, spectral characteristics of the output signal) and other parameters that require monitoring are periodically measured (approximately every 5 $\mu$s or faster, and preferably every 1 $\mu$s or faster). The signal processing unit 48 may comprise a memory 48A containing a table with minimum and maximum acceptable values for these parameters. Monitoring software 48B of the digital signal processing unit compares the digital data corresponding to the actual conditions to the tabulated parameter values and, if the data conditions seems to be outside the acceptable range, raises an alarm flag within the signal processing unit 48 and sends a warning signal to a central monitoring location 60 by using some data bus. In response to the alarm flag the signal processing unit 48 may shut down the amplifier (in order to protect it from possible damage) by turning off the pumps, reduce the amount of current going to the laser diode or adjust the temperature of the amplifier or its individual elements by use of one or more temperature conditioner 65, such as a cooler or a resistive heater, for example. In addition, if the digital signal processing unit 48 detects the loss of input signal, the signal processing unit 48 may shut down the pumps, wait for signal to be restored and then turn on the pumps to activate the amplifier. This would avoid amplifying noise, in the absence of an information carrying input signal. Finally, the temperature of different amplifier components, such as, for example, filters, gratings or couplers, may also be adjusted by the signal processing unit 48 and one or more heater/cooler drivers 65A that control the temperature provided by heaters/coolers 65 to provide dynamic tuning of the gain spectrum to compensate for aging of the amplifier, changed environmental conditions or other perturbations. The utilized heaters/coolers 65 may be coil heaters, laser pump heaters/coolers, or other devices, as needed.

This embodiment utilizes a fixed-point digital signal processor (DSP) (integer arithmetic) as the signal processing unit 48 because of its high speed, low cost and small size. An example of such DSP processor is the Motorola 5630x series processor. It has 24-bit single-precision resolution and runs at high speeds (i.e., speeds of at least 100 MHz). A DSP processor operating at 300 MHz, recently announced by Motorola would provide more computing power, thus allowing for a more complex control algorithm and a more responsive amplifier. However, other signal processing units 48 may include, for example, a floating point DSP, a complex programmable logic device (CPLD), a field programmable gate array (FPGA), a microprocessor, a microcontroller or a combination thereof. To increase computational power of the controller 40, a plurality signal processing units 48 may also be utilized.

Let's denote the digital outputs from A-to-D converters 46 as $P_{out}(k)$ and $P_{IN}(k)$, where $P_{out}(k)$ represents a discrete value of the scaled total output power signal $P_{out}(t)$, and $P_{IN}(k)$ is a discrete value of the scaled total input power $P_{in}(t)$. In this embodiment the output and input powers are scaled in order to correctly represent them within the available numeric range. The values $P_{OUT}(k)$ and $P_{in}(k)$ are represented in at least 12-bit resolution from the Electronic component side 39 and when they enter the Digital Processor side 41 they are zero padded (by adding zeros in front or behind the 12 digit numeral to create a numeral represented by more digits) to higher resolution (24 bits for the above mentioned Motorola DSP 5630x processors).

From this point on the digital control signal u(k) is calculated by using some of standard control laws. As stated above, in this embodiment we use the proportional plus integral (PI) controller in the form:

$$u(t) = K_p e(t) + K_i \int_0^t e(\tau) d\tau \qquad (1)$$

where u(t) represents current or power that controls the laser pump; $K_p$ is a proportional constant of the PI controller; $K_i$ is an integral constant of the PI controller; e(t) represents error signal, i.e. the difference between the desired value for gain or output power of the amplifier, given as the setpoint $G_{sp}$ or $P_{sp}$, respectively. When the amplifier is operating in either gain or power mode the error signal is:

$$e(t) = \begin{cases} G_{sp}P_{in}(t) - P_{out}(t), & \text{for gain control} \\ P_{sp} - P_{out}(t), & \text{for power control} \end{cases} \qquad (2)$$

The equation (1) has to be converted to a discrete form with the sampling interval of h seconds, since it is implemented in digitally by the digital signal processor (DSP) 48. A discrete transfer function in Z space of equation (1) obtained by bi-linear transform is $$U(z^{-1}) = \left[K_p + \frac{K_i}{1 - z^{-1}}\right] E(z^{-1}) \qquad (3)$$

where $U(z^{-1})$ is the complex form of the control function in frequency domain. The above equation (3) can be represented in a difference equation form $$u(k)=u(k-1)+(K_p+K_i h)e(k)-K_p e(k-1) \qquad (4)$$

where the variable k denotes the current sampling instant, i.e. t=kh, where h is a current sampling interval. The algorithm given below describes the implementation of the Gain/Output power control with PI controller. Many other controller algorithms can also be used. The following is a description of the exemplary algorithm 100.

The algorithm 100 may include the following steps:
1. Choosing the control mode (Gain or Power or constant pump power)
2. Setting the sampling interval h and the controller parameters $K_p$ and $K_i$. A typical sampling interval is about 1 usec and the choice of controller parameters depends on the type of the amplifier.
3. If the control mode is Gain, setting the following reference values:
   $G_{sp}$=0 and $P_{sp}$=0. Go to 5.
4. If the control mode is Power, setting the following reference values:
   $G_{sp}$=0 and $P_{sp}\neq$0.
5. At sampling time t:
   (i) Converting the analog values for input and output optical power to digital form by AD converter (ii) Multiplying the input signal $P_{in}(k)$ by the gain set point $G_{sp}$. (iii) Calculating the error signal e(k)

$e(k)=P_{sp}-e'(k)$, where $e'(k)=G_{SP}P_{IN}(t)-P_{OUT}(t)$; and (iv) Calculating the control signal u(k) as a function of the error signal $u(k)=u(k-1)+(K_p+K_i h)e(k)-K_p e(k-1)$.

6. Transforming the control signal to analog form u(k) →u(t) with D-to-A converter. This signal controls the pump laser by converting the electric current to optical power $P_p(t)$.
7. Waiting until the end of sampling interval h and then seting t+1→t and going back to step 5.

It is noted that the step of obtaining value for input and output power electronic circuitry DC offset is usually done only once, during the amplifier manufacturing process.

Illustrations of the Controller Performance

FIGS. 2A–D, 3A–D, and 4A–D illustrate the closed-loop performance of the controller 40. (By closed-loop we mean that the control algorithm is in place and provides feed-back control.) More specifically, FIGS. 2A–2D and 3A–3D indicate the performance of the amplifier 10 in the Gain Control Mode, while FIGS. 4A–4D illustrate the performance of the amplifier 10 in the Output Power Control Mode.

Figure 2A:
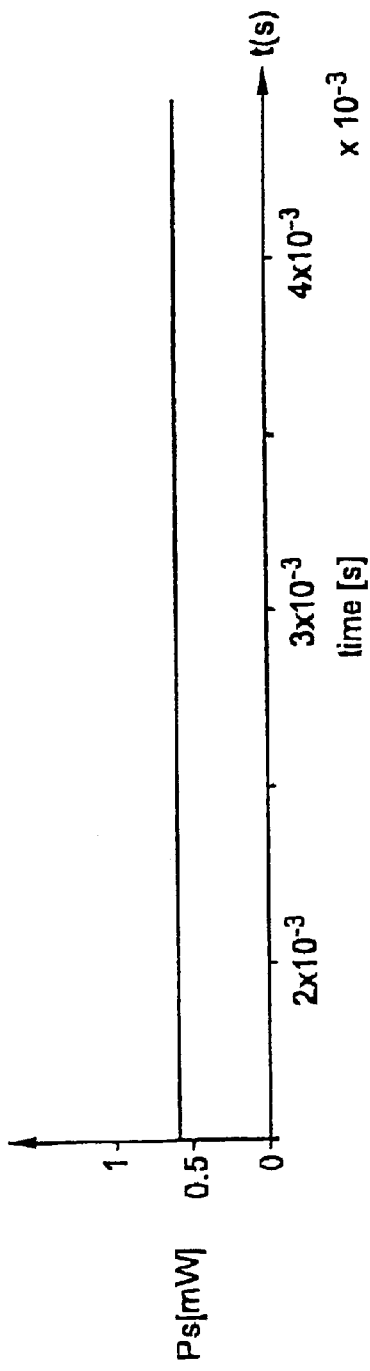
FIGS. 2A–2D illustrate a close-loop Gain Control Mode performance of the amplifier of FIGS. 1A and 1B when input signal is constant.
Figure 2B:
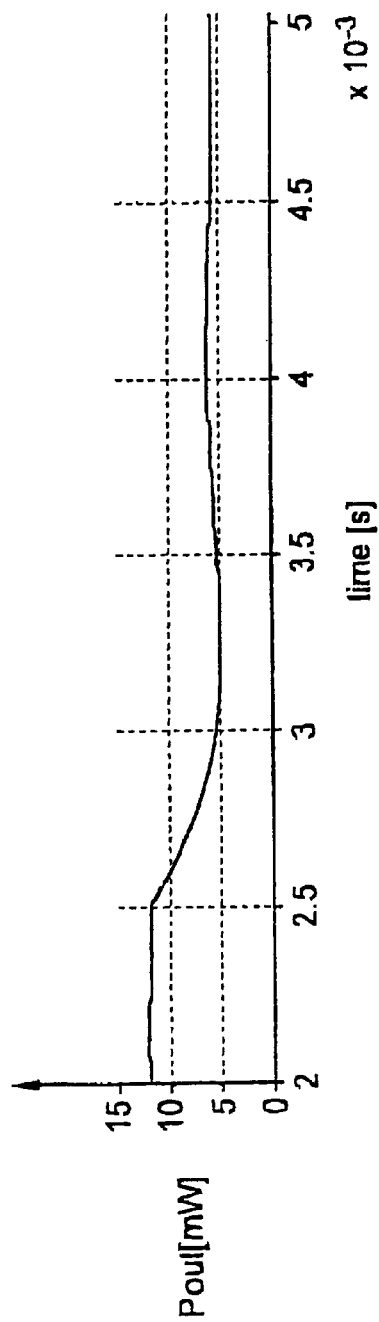
Figure 2C:
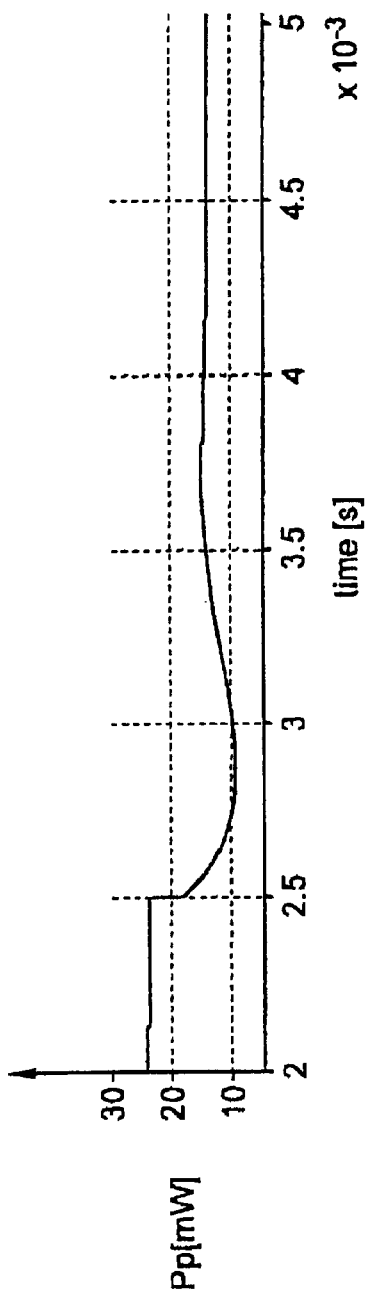
Figure 2D:
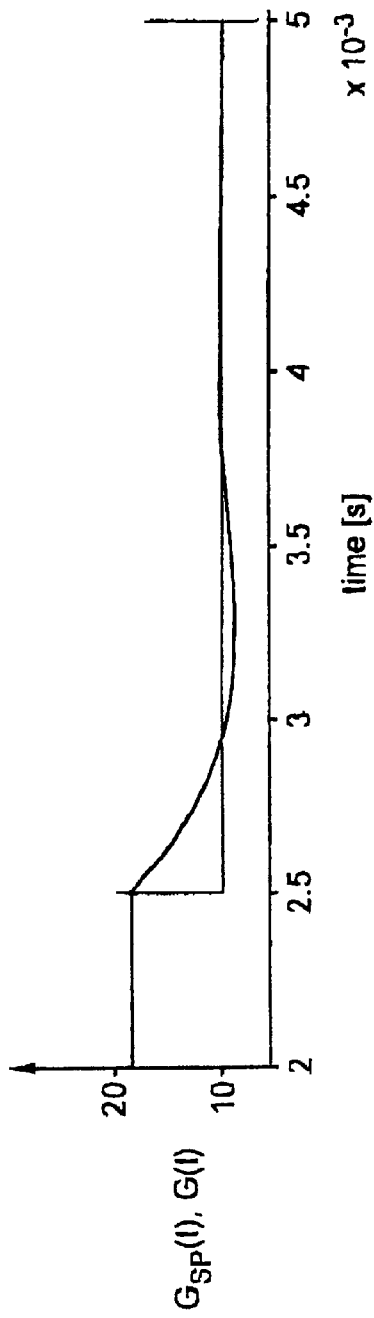

FIGS. 2A, 2B and 2C illustrate the behavior of input signal $P_s$, output signal $P_{out}(t)$, and the pump laser control signal $P_p(t)$, respectively. FIG. 2D shows the change of the set point gain $G_{sp}$ and the resultant change in actual gain $G(t)$. FIGS. 2A–2D illustrate that while input power Pin remains constant, when the user'specified value for $G_{sp}$ changes, the optical power $P_p(t)$ supplied by the pump laser source 22 changes in order to change the actual gain G(t) of the amplifier 10. FIG. 2C also shows that the output power $P_{out}$ of the amplifier 10 changed in response to the change in pump power $P_p(t)$. FIG. 2D indicates that in this embodiment the gain value G(t) reached its specified gain value level in $3.5 \times 10^{-3}$ seconds.

Figure 3A:
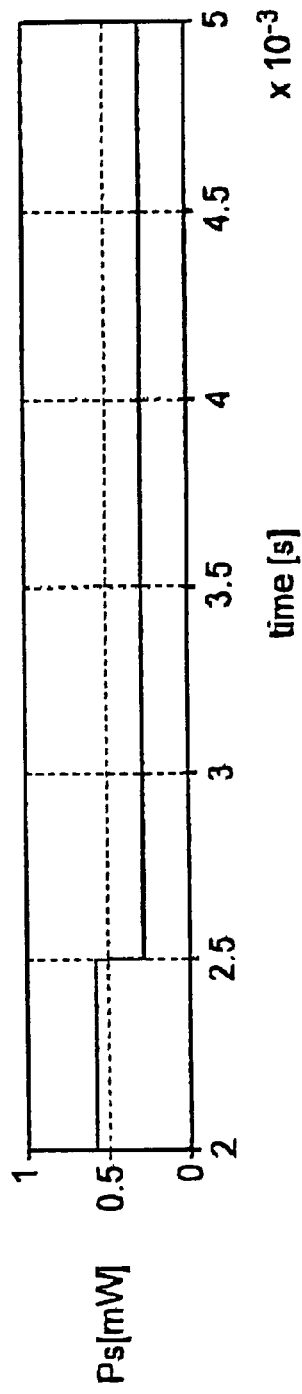
FIGS. 3A–3D illustrate a close-loop Gain Control Mode performance of the amplifier of FIGS. 1A and 1B when input signal drops.
Figure 3B:
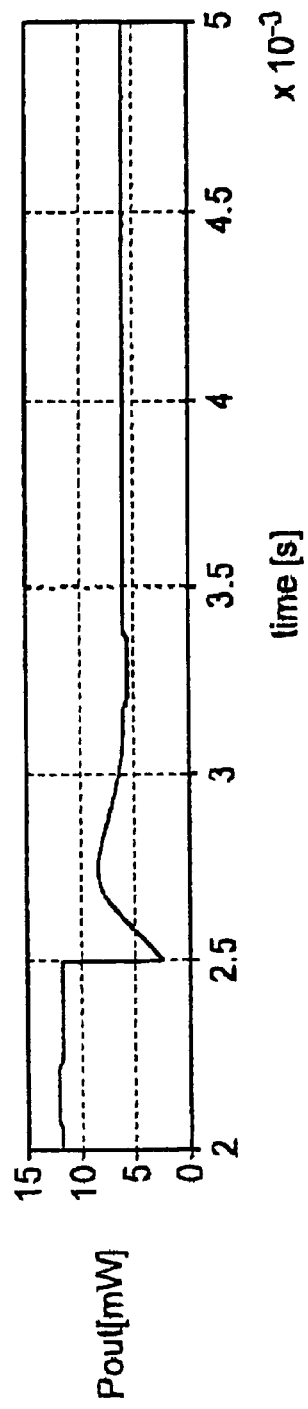
Figure 3C:
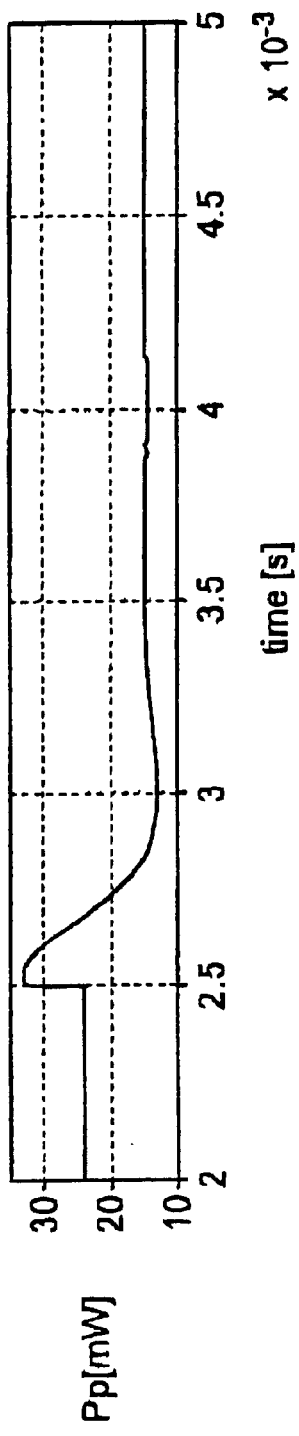
Figure 3D:
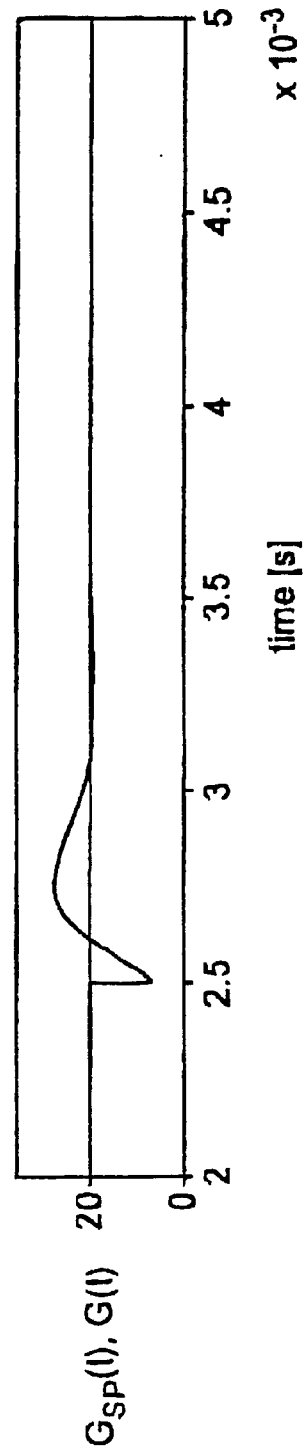

FIGS. 3A–3D are similar to FIGS. 2A–2D, the only difference being that the input signal $P_s$ changes to simulate a drop of some input channels (See FIG. 3A), while the setpoint gain $G_{sp}$ remains constant at 20 dB (see FIG. 3D). FIG. 3D illustrates that the gain G(t) drops quickly when input signal $P_s$ drops, but the controller 40 brings it back to its setpoint value in about $0.5 \times 10^{-3}$ seconds. FIG. 3C illustrates that this is achieved through a fast increase in the optical pump power $P_p(t)$ supplied by the pump laser source 22. controller 40 in the Output Power Control Mode.

Figure 4A:
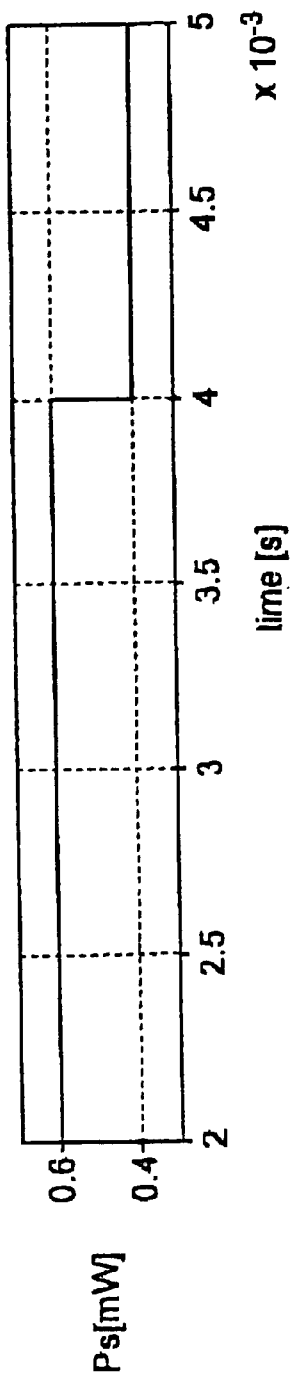
FIGS. 4A–4D illustrate a close-loop Power Control Mode performance of the amplifier illustrated in FIGS. 1A and 1B.
Figure 4B:
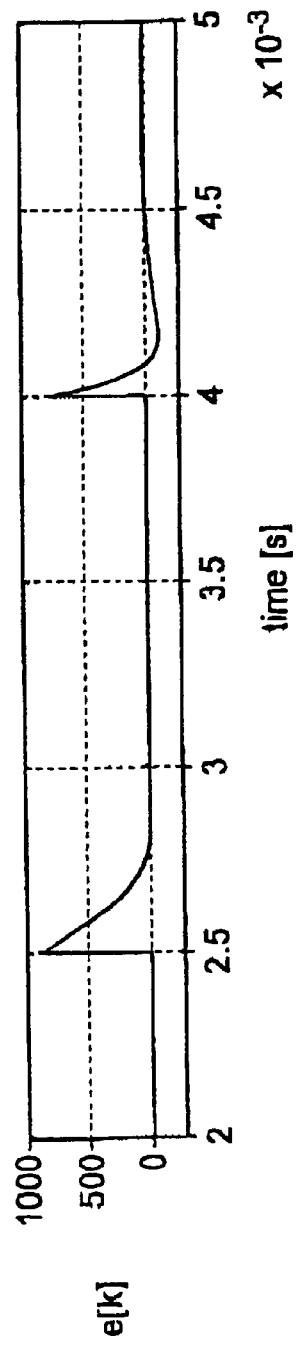
Figure 4C:
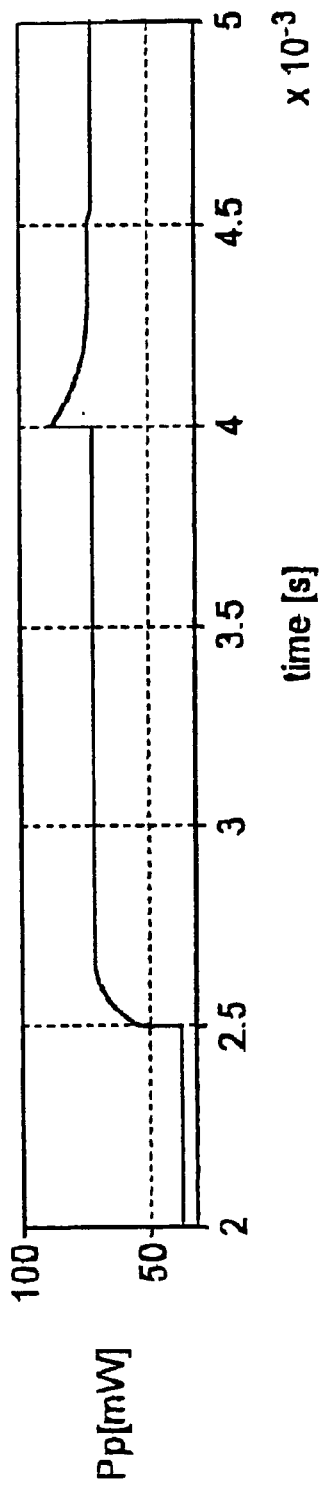
Figure 4D:
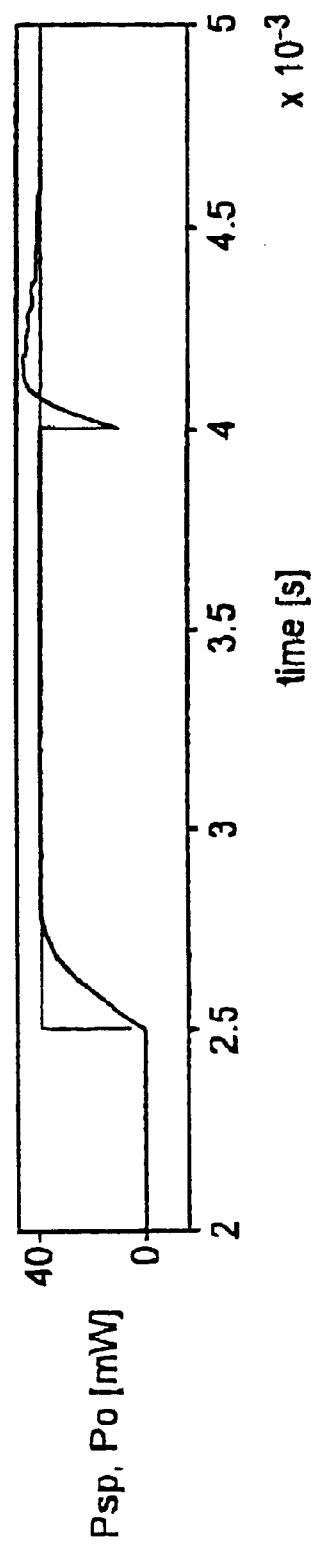

FIG. 4D illustrates that the setpoint value of output signal $P_{sp}$ changes from 20 mW to 40 mW at t=2.5 ms. At this time the controller 40 increases the pump power $P_{out}$(t=2.5 ms) to about 70 mw (see FIG. 4C) and thus drives the amplifier output power $P_{out}(t)$ from 20 to 40 mW in less than 0.5 ms. As a result, the error signal e(k), illustrated in FIG. 4B, drops down to zero. FIG. 4A illustrates that the input signal $P_s(t)$ drops at t=4 ms. This corresponds to a drop in output power $P_o$ and the corresponding increase in the error signal e(k). FIGS. 4C and 4D illustrate that the disturbance in output power caused by change of input signal $P_s(t)$ is quickly eliminated by increase in the pump power $P_p$.

Figure 5A:
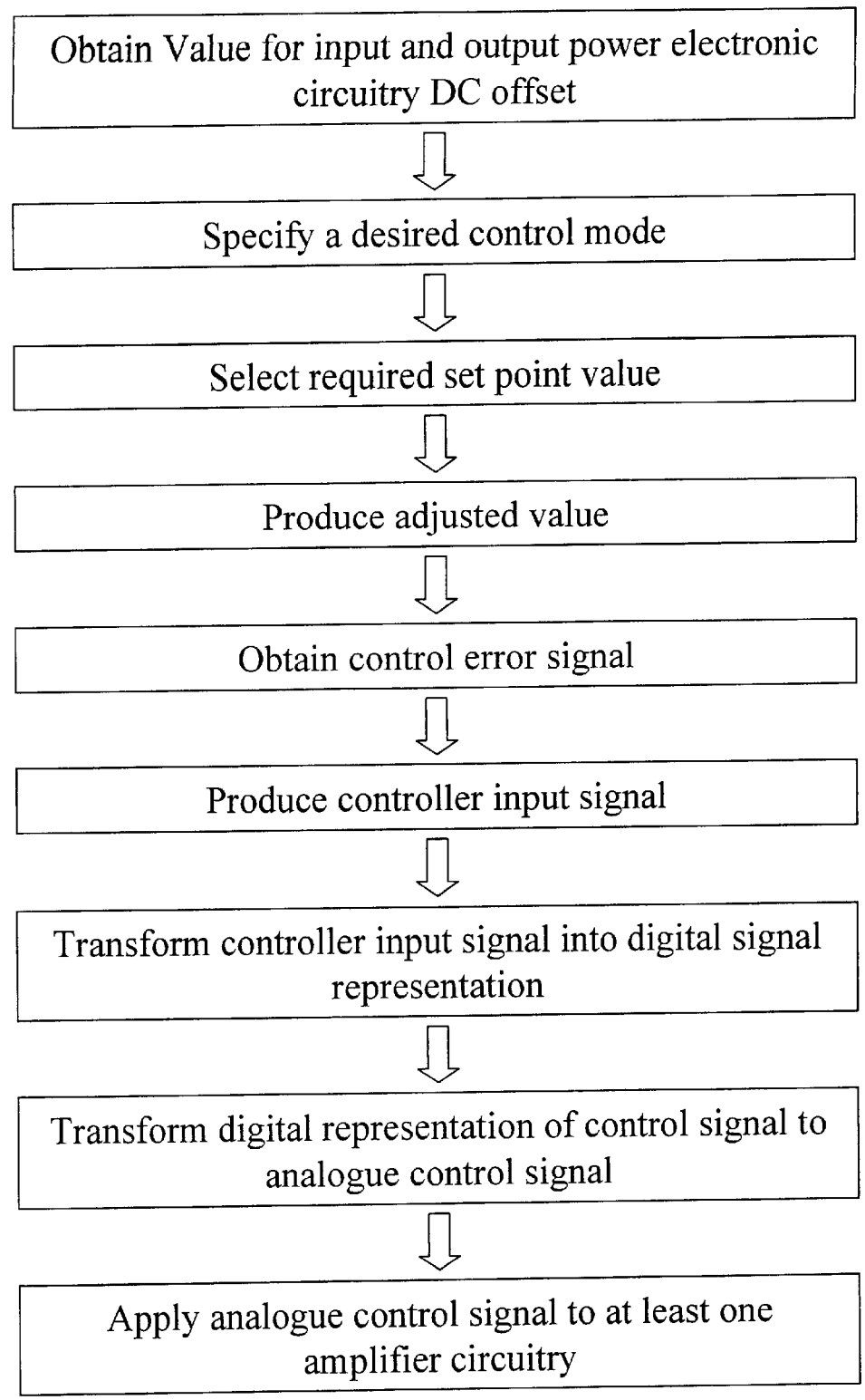
FIGS. 5A and 5B illustrate schematically exemplary algorithms utilized by the optical amplifier of FIG. 1A.
Figure 5B:
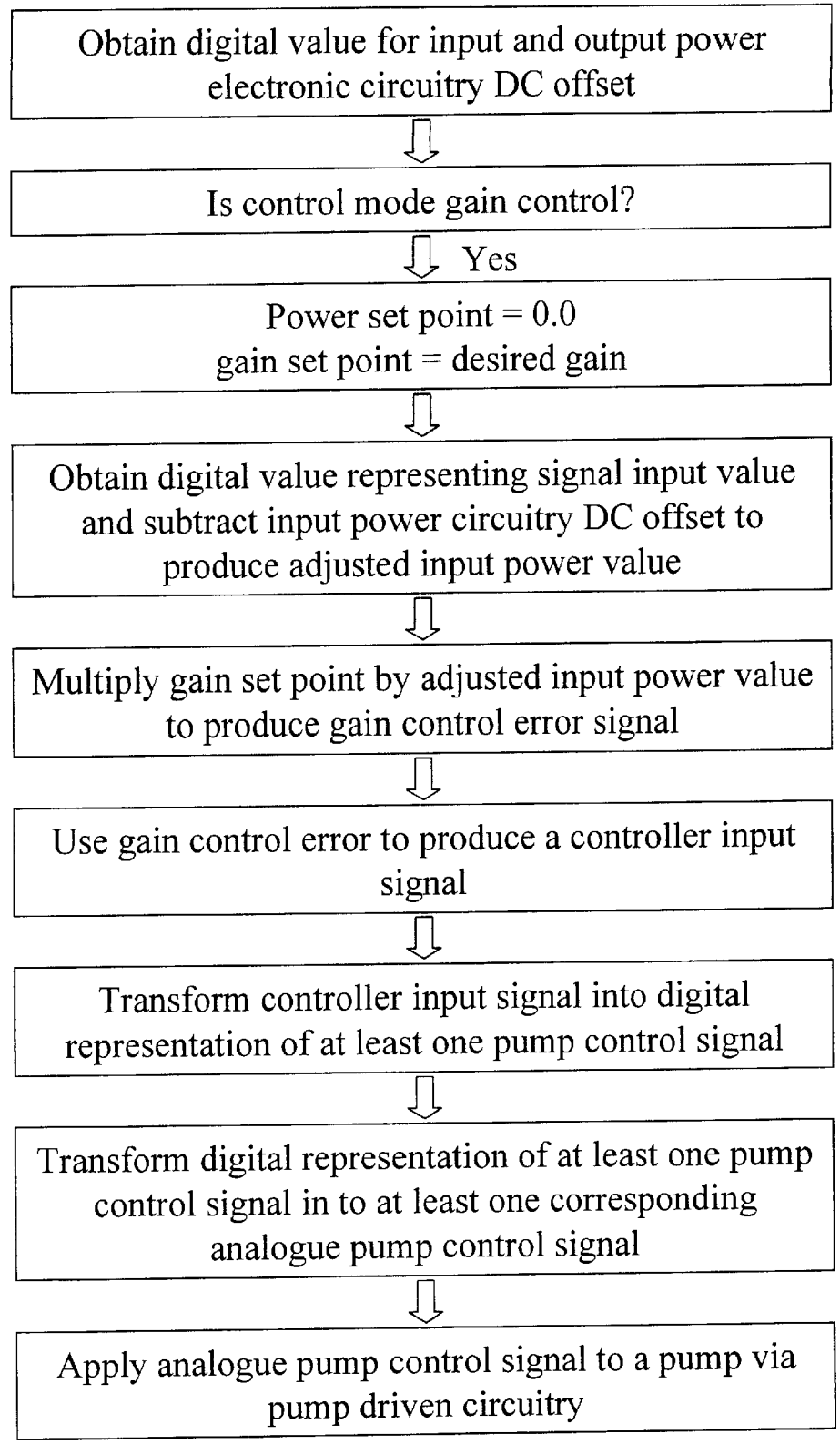

FIGS. 5A and 5B illustrate schematically exemplary algorithms utilized by the optical amplifier of FIG. 1A.

An improved optical amplifier and a simple new method for automatic electronic control of optical amplifiers have been described. The improved method utilizes the capabilities of a digital processor and simple control algorithm to achieve (1) gain control mode or (2) output power control mode. It has a capability of setting the reference values for gain or output power and flexibility of choice of the control algorithm. The improved amplifier can utilize more complex control laws than the classical proportional plus integral controller subject to the need and the digital signal processor speed. This control method is suitable for use in the communication systems where the remote control of the device is required.

It is intended that the present invention cover the modifications and adaptations of this invention as defined by the appended claims and their equivalents.

We claim:

1. A method for controlling performance of an optical amplifier, said method including the following steps:
   (i) obtaining value for input and output power electronic circuitry DC offset;
   (ii) specifying a desired control mode among at least two control modes;
   (iii) selecting required set point value;
   (iv) obtaining a required value and subtracting its corresponding DC offset to produce adjusted value;
   (v) obtaining control error signal by utilizing said adjusted value;
   (vi) subtracting said control error signal from any number to produce a controller input signal;
   (vii) transforming said controller input signal into digital representation of at least one control signal by a control algorithm;
   (viii) transforming said digital representation of said at least one control signal into at least one corresponding analog control signal; and
   (ix) applying said at least one analog control signal to at least one amplifier component via driver circuitry.

2. The method for controlling performance of an optical amplifier, according to claim 1, wherein said control signal is a pump control signal and wherein said amplifier component is a pump source.

3. A method for controlling gain of an optical amplifier, said method including the following steps:
   (i) obtaining digital value for input and output power electronic circuitry DC offset;
   (ii) if control mode is gain control, then selecting the following set point values: power set point=0.0, gain set point=desired gain;
   (iii) obtaining digital value representing signal input value and subtracting the input power electronic circuitry DC offset to produce adjusted input power value;
   (iv) obtaining value representing signal output value and subtracting the output power electronic circuitry DC offset to produce adjusted output power value;
   (v) multiplying the gain setpoint by said obtained adjusted input power value and subtracting from this product the adjusted output power value to produce gain control error signal;
   (vi) subtracting said gain control error signal from any number to produce a controller input signal;
   (vii) transforming by a control algorithm said controller input signal into digital representation of at least one pump control signal;
   (viii) transforming said digital representation of said at least one pump control signal into at least one corresponding analog pump control signal; and
   (ix) applying said at least one analog pump control signal to at least one pump via pump driver circuitry.

4. A method for controlling gain of an optical amplifier, said method including the following steps:
   (i) obtaining value for input and output power electronic circuitry DC offset;
   (ii) if control mode is gain control, then selecting the following set point values: power set point=0.0, gain setpoint=desired gain;

(iii) obtaining digital value representing signal input value and subtracting the output power electronic circuitry DC offset to produce adjusted input power value;

(iv) obtaining digital value representing signal output value and subtracting the output power electronic circuitry DC offset to produce adjusted output power value;

(v) dividing said adjusted output power value by gain set point and subtracting from this adjusted input power to obtain gain control error signal;

(vi) subtracting said gain control error signal from any number to produce a controller input signal;

(vii) transforming said controller input signal into digital representation of at least one pump control signal by a control algorithm;

(viii) transforming said digital representation of said at least one pump control signal into at least one corresponding analog pump control signal; and (ix) applying said at least one analog pump control signal to at least one pump via pump driver circuitry.

5. A method for controlling gain of an optical amplifier, said method including the following steps:

(i) obtaining value for input and output power electronic circuitry DC offset;

(ii) specifying a desired control mode among at least two control modes, said two control modes being Gain control and output power control;

(iii) if control mode is gain control then selecting the following set point values: power set point=0.0, gain set point=desired gain;

(iv) obtaining digital value representing signal input value and subtracting the input power electronic circuitry DC offset to produce adjusted input power value;

(v) obtaining digital value representing signal output value and subtracting the output power electronic circuitry DC offset to produce adjusted output power value;

(vi) either multiplying the gain setpoint by said obtained adjusted input power value and subtracting this from the adjusted output power value, or dividing said adjusted output power value by gain set point and subtracting from this adjusted input power to obtain gain control error signal;

(vii) subtracting said gain control error signal from any number to produce a controller input signal;

(viii) transforming said controller input signal into digital representation of at least one pump control signal by a control algorithm;

(ix) transforming said digital representation of said at least one pump control signal into at least one corresponding analog pump control signal; and (x) applying said at least one analog pump control signal to at least one pump via pump driver circuitry.

6. The method according to claim 5, further including pump current controls.

7. A method for controlling output power of an amplifier, said method including the following steps:

(i) obtaining value for output power electronic circuitry DC offset;

(ii) specifying a desired control mode among at least two control modes, wherein one of said two control modes being output power control;

(iii) if control mode is output power control, then selecting the following set pint values: output power set point=desired power, gain setpoint=0.0;

(iv) obtaining digital value representing signal output value and subtracting output power electronic circuitry DC offset to produce adjusted output power value;

(v) subtracting said adjusted output power from output power set-point, producing a controller input signal;

(vi) transforming said controller input signal into digital representation of at least one pump control signal by a control algorithm;

(vii) transforming said digital representation of said at least one pump control signal; and (viii) applying said at least one analog pump control signal to at least one pump via pump driver circuitry.

8. A method for controlling pump current optical power, including the following steps:

(i) obtaining value for current that is fed to the pump and electronic circuitry DC offset;

(ii) specifying a desired control mode among at least two control modes, wherein one of said two control modes being pump current control;

(iii) if control mode is pump current control, then selecting the following set point values: pump current set point=desired pump current, pump power set point=0.0;

(iv) obtaining digital value representing pump current value and subtracting the electronic circuitry DC offset to produce adjusted pump current value;

(v) subtracting said adjusted pump current value from pump current set-point, producing a controller input signal;

(vii) transforming said controller input signal into digital representation of at least one pump control signal by a control algorithm;

(viii) transforming said digital representation of at least one pump control signal into at least one corresponding analog pump control signal; and (ix) applying said at least one analog pump control signal to at least one pump via driver circuitry.

9. A method for controlling pump optical power, including the following steps:

(i) obtaining value for optical pump power and electronic circuitry DC offset;

(ii) specifying a desired control mode among at least two control modes, wherein one of said two control modes being optical pump power control;

(iii) if control mode is optical pump power control, then selecting the following set point values: pump current set point=0.0, optical pump power set point=desired value;

(iv) obtaining a digital value representing optical pump power value and subtracting electronic circuitry DC offset to produce adjusted optical pump power value;

(v) subtracting said adjusted optical pump power value from pump optical pump power set point, producing a controller input signal;

(vi) transforming said controller input signal into digital representation of at least one pump control signal by a control algorithm;

(vii) transforming said digital representation of said at least one pump control signal into at least one corresponding analog pump control signal; and (viii) applying said at least one analog pump control signal to at least one pump via driver circuitry.

10. A method for compensating for ASE in gain control mode while controlling gain of an optical amplifier, said method including the following steps:

(i) obtaining value for input and output power electronic circuitry DC offset;
(ii) selecting the following set point values: power set point=0.0, gain set point=desired gain,
(iii) obtaining digital value representing signal input value and subtracting input power electronic circuitry DC offset to produce adjusted input power value;
(iv) obtaining digital value representing signal output value and subtracting output power electronic circuitry DC offset to produce adjusted output power value;
(v) obtaining the ASE content of said adjusted input power value by either utilizing a lookup table or a formula and subtract ASE content from said adjusted input power value to produce ASE adjusted output power value;
(vi) either multiplying the gain setpoint by said obtained ASE adjusted input power value and subtracting this from the ASE adjusted output power value, or dividing said ASE adjusted input power to obtain gain control error signal;
(vii) subtracting said gain control error signal from any number to produce a controller input signal;
(viii) transforming said controller input signal into digital representation of at least one pump control signal by a control algorithm;
(xi) transforming said digital representation of said at least one pump control signal into at least one corresponding analog pump control signal; and
(x) applying said at least one analog pump control signal to at least one pump via driver circuitry.

11. A method for compensating for ASE in output power control mode of amplifier, said method including the following steps:
(i) obtaining value for output power electronic circuitry DC offset;
(ii) specifying a desired control modes being output power control;
(iii) if control mode is output power control then selecting the following set point values: output power set point= desired power, gain set point=0.0,
(iv) obtaining digital value representing signal output value and subtracting output electronic circuitry DC offset to produce adjusted output power value;
(v) utilizing a lookup table or formula to obtain the ASE adjusted output power from output power value;
(vi) subtracting said ASE adjusted output power from output power set point, producing a controller input signal;
(vii) transforming said controller input signal into digital representation of at least one pump control signal by a control algorithm;
(viii) transforming said digital representation of said at least one pump control signal into at least one corresponding analog pump control signal; and
(ix) applying said at least one analog pump control signal to at least one pump via pump driver circuitry.

* * * * *